Patented Mar. 6, 1934

1,949,927

UNITED STATES PATENT OFFICE 1,949,927

PROCESS OF MAKING THE SULPHATES OF COPPER AND ZINC

Harry P. Corson, Lakewood, Ohio, assignor to The Grasselli Chemical Company, Cleveland, Ohio, a corporation of Delaware No Drawing. Application November 8, 1932, Serial No. 641,758

3 Claims. (Cl. 75—18)

The present invention relates to a process of dissolving brass in sulphuric acid for the obtainment of aqueous solutions containing the sulphates of copper and zinc and comprises passing through the reaction mixture of brass and acid a gas consisting of oxygen or comprising oxygen in which the absolute pressure of the oxygen is greater than the partial pressure of oxygen in atmospheric air at the temperature of the reaction mixture.

Brass alloys, which comprise essentially the series of alloys involving copper and zinc, are not readily attacked by dilute sulphuric acid, and it is therefore not possible to make solutions therefrom containing the sulphates of copper and zinc by dissolving the scrap metal, even if reduced to the form of turnings, borings or filings, by agitating them in a tank containing sulphuric acid. When this reaction is carried out in the presence of atmospheric air, there is an accelerated attack of the brass, but this is still slow and the operation is not efficient.

I have found that if the oxygen introduced in the system brass-sulphuric acid has a pressure greater than the partial pressure of oxygen in atmospheric air, the rate of attack of the brass by dilute sulphuric acid is greatly accelerated and that in this manner mixed solutions of zinc and copper sulphates are easily obtained.

A gas containing oxygen at a pressure greater than the partial pressure of oxygen in atmospheric air is easily obtained in two manners: for instance by using pure oxygen or enriching atmospheric air with oxygen and by using atmospheric air under super-atmospheric pressures. In the first instance the total pressure of the gas mixture is not increased but the oxygen has a greater partial pressure, in the second case the relative pressures of the oxygen and the inert constituents of air are not changed, but as the total pressure of the gas mixture is increased, the oxygen has also a higher absolute pressure.

I can, for instance, bubble pure or a concentrated oxygen gas through dilute sulphuric acid in contact with brass metal and obtain a considerably increased rate of attack compared with an operation where atmospheric air under ordinary pressure is contacted with the reaction mixture.

I prefer, however, to confine the acid and the brass in a closed vessel and maintain in said vessel, as by bubbling compressed air through the liquid, an atmosphere in which oxygen is present at a pressure greater than its partial pressure in atmospheric air.

Pressures of about 30 to 75 lbs. gauge in such a vessel are entirely sufficient to speed up the action of the acid on the metal; the upper limit of pressure is entirely dependent upon matters of convenience and economics.

The temperature at which I operate the attack of the brass metal in my novel process is independent of the oxygen pressure I specify. At 90° C. and with increased oxygen pressure I obtain a very rapid rate of attack. When operating in an autoclave, or pressure vessel, I can go as far as the boiling point of the solution. While there is with increased temperature an increase in the rate of attack; the main acceleration in my process is due and depends upon the increase in the oxygen pressure.

In a practical embodiment of my invention I used, for instance, a homogeneously lead lined, upright cylinder which I filled with brass turnings. I added thereto 80 lbs. of a 36° Bé. solution of mixed zinc and copper sulphates as contained from a preceding attack of brass with sulphuric acid. I diluted this liquor with 10 lbs. water and added 35 lbs. 66° Bé. sulphuric acid. The vessel was closed, live steam and air introduced and the vessel was vented to maintain a pressure of 65 lbs. gauge therein. Enough steam was introduced to supplement the heat of reaction and maintain a temperature of between 140 and 150° C. After 45 minutes the acid was consumed and 18 lbs. of metal dissolved.

A concentrated solution of zinc and copper sulphates was so obtained.

The zinc and copper content of such solutions can be recovered by well known chemical means, and as these are not part of my invention need not be disclosed herein.

I also can evaporate the solution and dehydrate the sulphates which crystallize out. I obtain in this manner a mixture of dehydrated copper and zinc sulphates which has applications in agricultural fields as a fungicide.

I claim:

1. In a process of making a solution containing zinc and copper sulphates by the action of hot, dilute sulphuric acid upon brass, the step of introducing compressed air into the reaction mixture and maintaining the mixture at a temperature above 100° C. and a pressure greater than atmospheric and in acid condition.

2. The process of making a solution of copper and zinc sulphates which comprises dissolving brass in sulphuric acid at a temperature above 100° C. and under super-atmospheric pressure in the presence of compressed air.

3. The process of making a solution of copper and zinc sulphate which comprises dissolving brass in dilute sulphuric acid at a temperature above 100° C. and at a pressure greater than about 30 lbs. gauge and introducing compressed air into the reaction mixture.

HARRY P. CORSON.